United States Patent
Juez et al.

(10) Patent No.: US 11,226,132 B2
(45) Date of Patent: Jan. 18, 2022

(54) METHOD FOR THE PRECISELY FITTING POSITIONING OF AN INNER BOILER IN THE OUTER BOILER OF AN AIR-CONDITIONING CABINET AND AIR-CONDITIONING CABINET

(71) Applicant: Binder GmbH, Tuttlingen (DE)

(72) Inventors: Paula Bernedo Juez, Tuttlingen (DE); Nina Zeller, Deisslingen (DE)

(73) Assignee: Binder GmbH, Tuttlingen (DE)

( * ) Notice: Subject to any disclaimer, the term of this patent is extended or adjusted under 35 U.S.C. 154(b) by 0 days.

(21) Appl. No.: 16/831,040

(22) Filed: Mar. 26, 2020

(65) Prior Publication Data

US 2020/0224924 A1 Jul. 16, 2020

Related U.S. Application Data

(62) Division of application No. 16/037,774, filed on Jul. 17, 2018.

(30) Foreign Application Priority Data

Jul. 21, 2017 (DE) .......................... 10 2017 116527

(51) Int. Cl.
*F24F 13/20* (2006.01)
*F25D 23/06* (2006.01)
(Continued)

(52) U.S. Cl.
CPC .............. *F24F 13/20* (2013.01); *B23P 15/26* (2013.01); *F25D 23/063* (2013.01);
(Continued)

(58) Field of Classification Search
CPC ......... A47B 57/18; A47B 57/20; A47B 57/26; A47B 57/265; A47B 57/50; A47B 57/54; A47B 57/545; Y10T 29/49359
(Continued)

(56) References Cited

U.S. PATENT DOCUMENTS 1,929,952 A * 10/1933 Limpert .................. F25B 39/02
62/520
1,972,551 A * 9/1934 Dickey ................. F25B 39/024
62/520
(Continued)

FOREIGN PATENT DOCUMENTS

DE 3329855 4/1984
DE 3727298 3/1989
(Continued)

OTHER PUBLICATIONS

Chinese Patent Office, "First Office Action," and English translation thereof, issued in Chinese patent application No. 201810736416.8, dated Mar. 4, 2020; document of 16 pages.
(Continued)

*Primary Examiner* — Jason L Vaughan
(74) *Attorney, Agent, or Firm* — Akerman LLP; Peter A. Chiabotti

(57) ABSTRACT

An air-conditioning cabinet can have an outer chamber, an inner chamber with an inner chamber height, a cover, a bottom where the cover and bottom are separated by a distance that defines the inner chamber height, an inner chamber having a foot movably coupled to the inner chamber, where the inner chamber is arranged in the outer chamber, where the inner chamber height is less than the inner chamber height and where the foot is movably coupled to the inner chamber in such a manner that the inner chamber height is variable. Also, moving a position of the foot on the inner chamber can arrange the inner chamber such that the inner chamber is supported on the cover of the outer chamber and the foot is supported on the bottom of the outer chamber, and the foot can be fixed in the position.

5 Claims, 4 Drawing Sheets

(51) Int. Cl.
  *B23P 15/26* (2006.01)
  *F25D 31/00* (2006.01)
  *B01L 7/00* (2006.01)

(52) U.S. Cl.
  CPC ......... *F25D 23/066* (2013.01); *F25D 23/067* (2013.01); *F25D 31/005* (2013.01); *B01L 7/00* (2013.01); *Y10T 29/49359* (2015.01)

(58) Field of Classification Search
  USPC ................. 248/274.1, 279.1, 288.11, 292.14
  See application file for complete search history.

(56) References Cited

U.S. PATENT DOCUMENTS

| | | | |
|---|---|---|---|
| 1,985,931 A * | 1/1935 | Kucher | F25B 39/024 |
| | | | 62/523 |
| 2,639,593 A | 5/1953 | Edvard | |
| 3,009,582 A | 11/1961 | Degener | |
| 4,035,093 A * | 7/1977 | Redshaw | F16B 5/0225 |
| | | | 403/4 |
| 4,381,442 A | 4/1983 | Guibert | |
| 4,585,923 A * | 4/1986 | Binder | F27B 17/02 |
| | | | 126/21 A |
| 4,708,252 A | 11/1987 | Azzi | |
| 5,029,790 A | 7/1991 | Payne | |
| 5,309,981 A * | 5/1994 | Binder | F24C 15/025 |
| | | | 126/21 A |
| 5,601,143 A | 2/1997 | Binder | |
| 6,129,224 A * | 10/2000 | Mingers | A47B 57/482 |
| | | | 211/190 |
| 9,380,807 B2 * | 7/2016 | Busby | A47B 47/0075 |
| 2009/0065493 A1 | 3/2009 | Hines, Jr. | |
| 2009/0195129 A1 | 8/2009 | Osawa et al. | |
| 2017/0258229 A1* | 9/2017 | Siffel | B01L 9/00 |

FOREIGN PATENT DOCUMENTS

| | | |
|---|---|---|
| DE | 69011953 | 1/1995 |
| DE | 4406145 | 8/1995 |
| DE | 19536279 | 5/1996 |
| DE | 19711311 | 10/1997 |
| DE | 10200901806 | 7/2010 |
| DE | 102009002796 | 11/2010 |
| DE | 202014005166 | 8/2014 |
| JP | 2001201248 | 7/2001 |

OTHER PUBLICATIONS

European Patent Office, "European Search Report", issued in European patent application No. 18177570, dated Nov. 30, 2018, document of 7 pages.

German Patent Office, "Office Action" issued in German Patent Application No. 10 2017 116 527.4, dated Feb. 26, 2018, document of 8 pages.

Russian Patent Office, "Search Report" issued in Russian Patent Application No. 2018126326, dated Feb. 19, 2019, document of 2 pages.

* cited by examiner

METHOD FOR THE PRECISELY FITTING POSITIONING OF AN INNER BOILER IN THE OUTER BOILER OF AN AIR-CONDITIONING CABINET AND AIR-CONDITIONING CABINET

CROSS-REFERENCE TO RELATED APPLICATIONS

This application is a divisional of, and claims the benefit of, U.S. application Ser. No. 16/037,774, filed Jul. 17, 2018, which claims priority to German Patent Application No. 10 2017 116 527.4, filed Jul. 21, 2017, each of which is incorporated by reference in its entirety.

BACKGROUND

The application relates to a method for the precisely fitting positioning of an inner chamber in the outer chamber of an air-conditioning cabinet and air-conditioning cabinet.

Air conditioning cabinets with an inner chamber, an outer chamber and a heating and/or cooling device arranged at least in sections between the outer chamber and the inner chamber have been known for many years, for example, from DE 33 29 855 A1 or DE 37 27 298 A1. In spite of this product having been known for a long time, a weak point in its manufacture, however, is still the arrangement of the inner chamber in or on the outer chamber, which arrangement should not only be stable but in addition should also fit as precisely well as possible in particular on the cover-side contact line of the inner chamber walls to the outer chamber in spite of occurring manufacturing tolerances. Even if two co-workers are involved in this manufacturing step, its processing safety and reproducibility remain problematic.

SUMMARY

The application is directed to structures and a method for the precisely fitting positioning of an inner chamber in the outer chamber of an air-conditioning cabinet and an air-conditioning cabinet with an inner chamber which can be positioned with a precise fitting. Structures and methods for such precisely fitting positioning of an inner chamber in the outer chamber of an air-conditioning cabinet and an air-conditioning cabinet with an inner chamber which can be positioned with a precise fitting are disclosed herein. Advantageous embodiments and further developments are also disclosed.

The method according to the present disclosure for the precisely fitting positioning of an inner chamber in the outer chamber of an air-conditioning cabinet can comprise the following steps:

Making available an outer chamber with a cover and a bottom located opposite the cover, Making available at least one component of an inner chamber, and Positioning the at least one component of the inner chamber between the cover and the bottom in the outer chamber.

In one arrangement such a cabinet can be arranged such that:

at least one component of the inner chamber is made available which has a lesser height than the height of the inner chamber of the outer chamber, which height is given by the distance between the cover and the bottom of the outer chamber, and on which component at least one foot is movably arranged in such a manner that the height of the at least one component of the inner chamber, and which includes the at least one foot which is movably arranged on it, is variable, a precisely fitting positioning is brought about by a changing of the position of the at least one foot on the component arranged in the inner chamber, in which the component of the inner chamber is supported on the cover of the outer chamber and the at least one foot is supported on the bottom of the outer chamber, and the foot is fixed in the position in which it brings about the precisely fitting positioning.

Therefore, the previously used attempt to adapt the component of the inner chamber as exactly as possible to the corresponding dimension of the outer chamber is given up and instead of it a "too small" component of the inner chamber is used which is not brought in a precisely fitting contact with the cover until by the adjusting of the feet which are movably arranged on the component of the inner chamber. This not only makes it possible to compensate the particular tolerances of the outer chamber but also proves to be clearly simpler as regards the carrying out of this work step since the introduction of a component of the inner chamber, which component is dimensioned with a precise fitting to the outer chamber, is often difficult.

It is mentioned here that the concept "air-conditioning cabinet" is to be broadly understood. An air conditioning cabinet denotes here every cabinet-like device in whose inner chamber a temperature can be adjusted which deviates from the environmental conditions. To this end, air-conditioning cabinets as a rule comprise a heating and/or cooling device which can be arranged at least in sections—therefore, for example, with a cooling hose or heating hose—in the inner chamber of the outer chamber, preferably between the outer chamber and the inner chamber. At least the inner chamber of the inner chamber is usually accessible by doors or flaps; the direction from which it is accessible is given by a loading direction.

Accordingly, in particular making the outer chamber available can take place in such a manner that the outer chamber already built into the later air-conditioning cabinet is made available completely with the later air-conditioning cabinet and the heating and/or cooling device; however the outer chamber can also be made available as an individual component preconfigured with more or less additional attached parts.

An outer chamber typically comprises at least two side walls, a bottom and a cover as well as optionally also a back wall.

The inner chamber can be formed in one piece, which then has the result that the sole component of the inner chamber is the inner chamber itself. However, it is typically built up from several individual parts or components, for example, of side walls between which an inner back wall or a bottom is then held. However, it can also comprise only side walls.

A preferred embodiment of the method provides that the precisely fitting positioning takes place by a shifting of the position of the foot in a plane parallel to the bottom of the outer chamber, wherein it is especially preferred that the shifting of the position of the foot takes place in a direction parallel to the component of the inner chamber on which the foot is arranged. This can be in particular the direction of a side wall of the inner chamber running parallel to the direction of access if this wall comprises the foot or the feet. These measures are advantageous because the "working direction" in which force must be exerted in order to achieve the precise fitting in of the component of the inner chamber is the access direction, which simplifies the exertion of force. For example, a shifting of the feet in an oblong hole or slot which runs obliquely to the bottom of the outer chamber and in which a bolt is guided which is supported on the corresponding component, in particular on a side wall of the inner chamber can bring about the precisely fitting arrangement by pressure in the access or loading direction of the air-conditioning cabinet while, for example, in the case of screw feet an impractical fingering would be necessary in order to tighten screws located close to the bottom.

The air-conditioning cabinet according to the present application can comprise an outer chamber with a cover and a bottom whose distance defines the height of an inner chamber of the outer chamber, comprises an inner chamber arranged in the outer chamber and comprises a heating and/or cooling device arranged at least in sections between the outer chamber and the inner chamber. Of course, it can additionally comprise doors, an outer skin, a frame or feet, which is often the case in air-conditioning cabinets.

In one embodiment of the application, at least one component of the inner chamber—for example, a side wall—has a lesser height than the height of the inner chamber of the outer chamber, which height is given by the distance between the cover and the bottom of the outer chamber, and on which component at least one foot is movably arranged in such a manner that the height of the at least one component, which was made available, of the inner chamber, and which includes the at least one foot which is movably arranged on it, is variable, so that a changing of the position of the at least one foot on the component, arranged in the outer chamber, of the inner chamber can bring about a precisely fitting positioning in which the component of the inner chamber is supported on the cover of the outer chamber and the at least one foot is supported on the bottom of the outer chamber and that the at least one foot can be fixed with a fixing means in this position. The advantage of this special design is in particular the fact that the arrangement of the inner chamber adapted to the outer chamber can be achieved by simple work steps with very good preciseness.

Such an air-conditioning cabinet is preferred if the at least one foot is arranged on the component of the inner chamber in such a manner that the height of the at least one available component of the inner chamber with the at least one foot arranged on it can be varied by a shifting parallel to the plane defined by the bottom of the outer chamber, wherein it is especially preferred if the at least one foot is arranged on the component of the inner chamber in such a manner that the height of the at least one available component of the inner chamber with the at least one foot arranged on it can be varied by a shifting parallel to the component of the inner chamber on which the foot is arranged. This applies in particular for a shifting parallel to the side wall of the inner chamber as the relevant component of the inner chamber here in the access direction or loading direction of the air-conditioning cabinet, which makes possible an especially simple and direct action.

In a concrete manner, such an arrangement of the foot on the component of the inner chamber can be brought about in that the component of the inner chamber comprises at least one bolt and that the at least one foot comprises an oblong hole in which the bolt is guided, wherein the distance of the oblong hole from the end of the foot facing the bottom of the outer chamber varies. Upon a shifting of the foot supported on the bottom of the outer chamber, the component of the inner chamber is then pressed upward and is therefore adapted to the extension of the particular outer chamber.

It is especially preferred if the oblong hole runs at an angle of about 45° relative to the bottom of the outer chamber.

Furthermore, it is advantageous if the foot has a surface for introducing a shifting force because it facilitates introducing an appropriate force during the assembly.

BRIEF DESCRIPTION OF THE DRAWINGS

The present application is explained in detail in the following using figures showing an exemplary embodiment. In the figures:

FIG. 2b: shows a second view of the foot from FIG. 2a.

FIG. 1a shows an air-conditioning cabinet 1 with open doors 3 so that the view into the interior of the air-conditioning cabinet is free. It can be recognized that the air-conditioning cabinet 1 comprises an outer chamber 10 in which an inner chamber 2 composed by components 21 is arranged. In this exemplary embodiment of an air-conditioning cabinet 1, shelves 4 are arranged on the inner chamber 2. The heating and/or cooling device of the air-conditioning cabinet 1 cannot be recognized in the view of FIG. 1a because it is covered by the inner chamber 2 and its components 21.

FIG. 1b shows a section A of the view into the interior of the air-conditioning cabinet 1, more precisely into its front right, lower corner. A section of the outer chamber 10 and of its bottom line 11 and the transitional area 12 to its right side wall 13 which is, however, largely covered by a component 21 of the inner chamber 2, here the right side wall of the inner chamber 2, can be recognized.

Figure 1A:
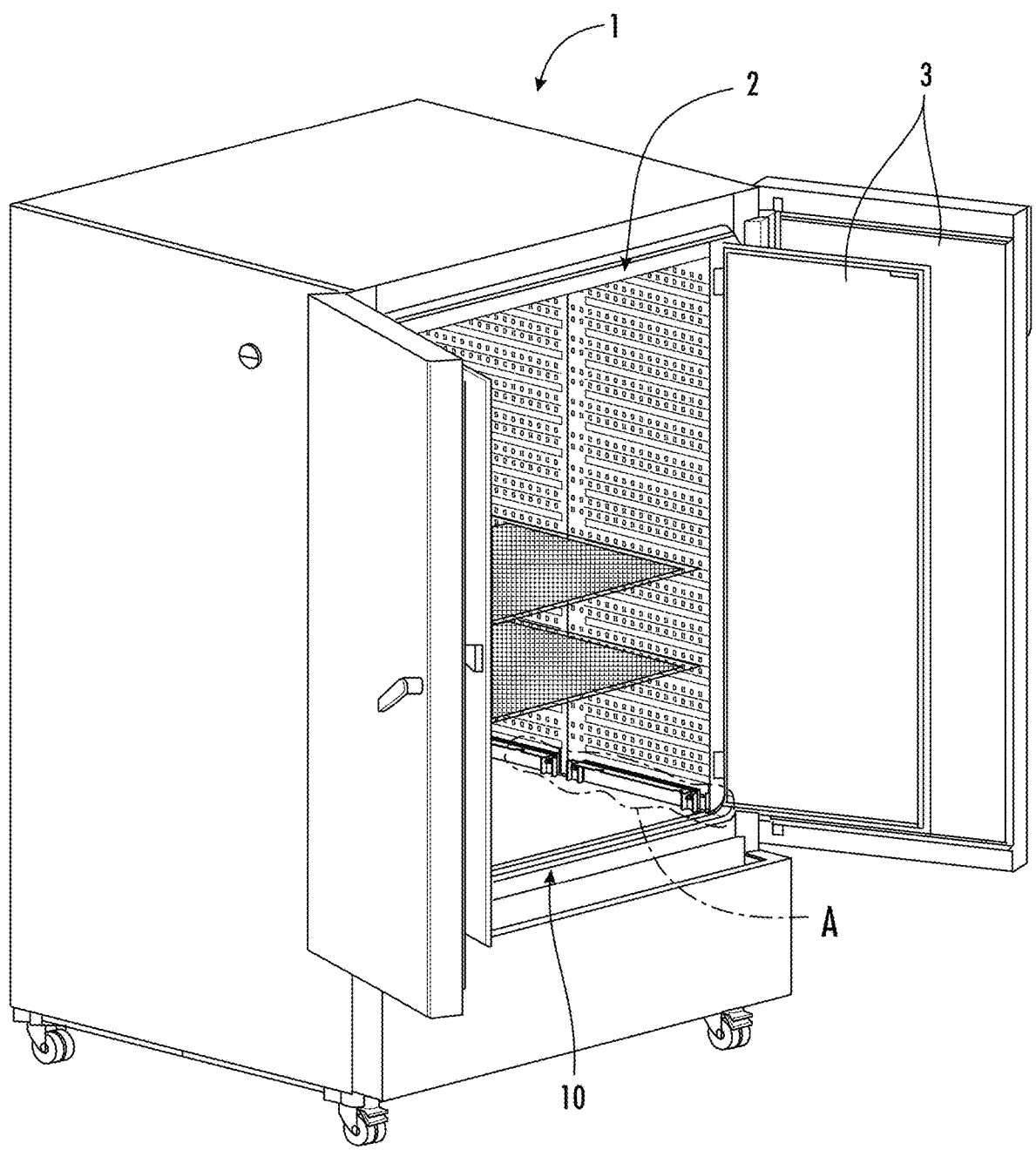
FIG. 1a: shows an air-conditioning cabinet with open doors.
Figure 1B:
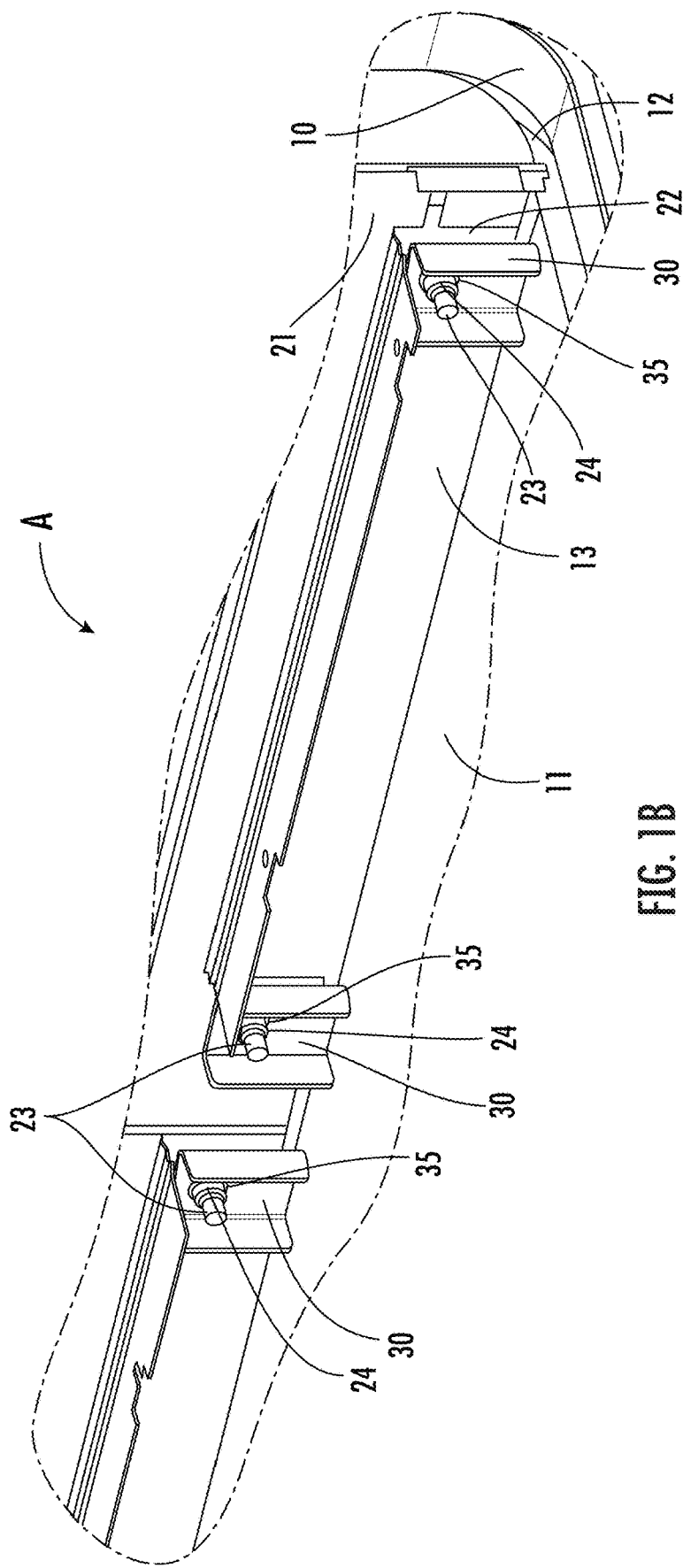
FIG. 1b: shows a sectional enlargement from FIG. 1a which shows the positioning of a component of the inner chamber in the outer chamber.

The component 21 of the inner chamber 2 does not stand directly on the bottom 11 of the outer chamber 10 but rather is supported thereby several feet 30, which directly and necessarily results in that the component 21 of the inner chamber 2 has a lesser height than the height of the inner chamber of the outer chamber 10 given by the distance between the cover, which cannot be recognized in FIG. 1, and the bottom 11 of the outer chamber 10.

The specific construction of the foot will now be explained in detail using the FIGS. 2a and 2b.

Figure 2A:
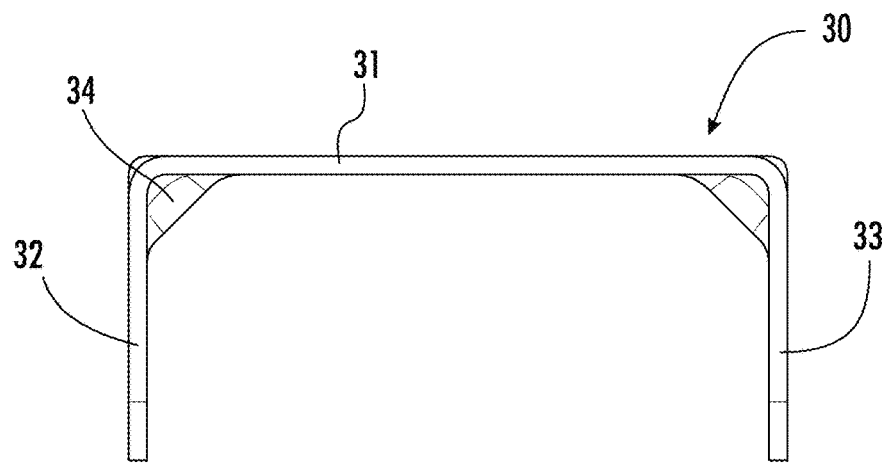
FIG. 2a: shows a first view of a foot.
Figure 2B:
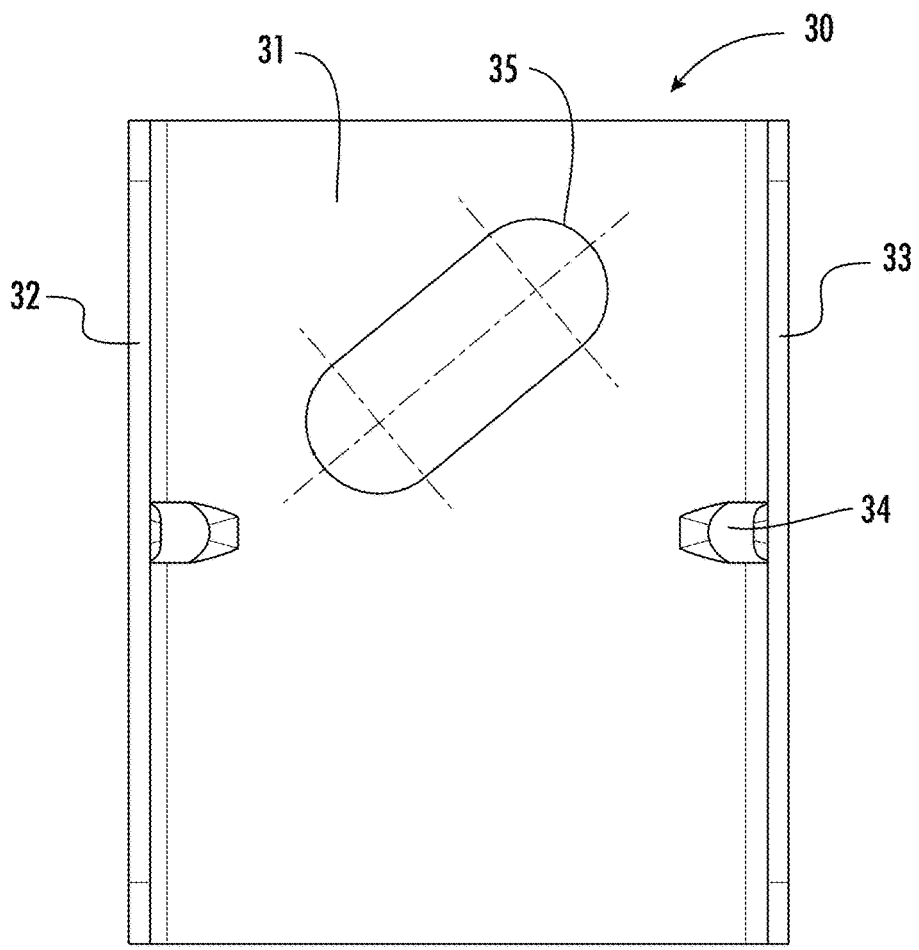

As can be readily recognized in the FIGS. 2a and 2b, the foot 30 has an approximately U-shaped cross section with a back 31 and two side walls 32, 33 standing vertically to the surface of the back 31 which are secured against bending with reinforcements 34. An oblong hole 35 running obliquely from the upper right to the lower left is arranged in the back 31 of the foot 30.

Figure 1C:
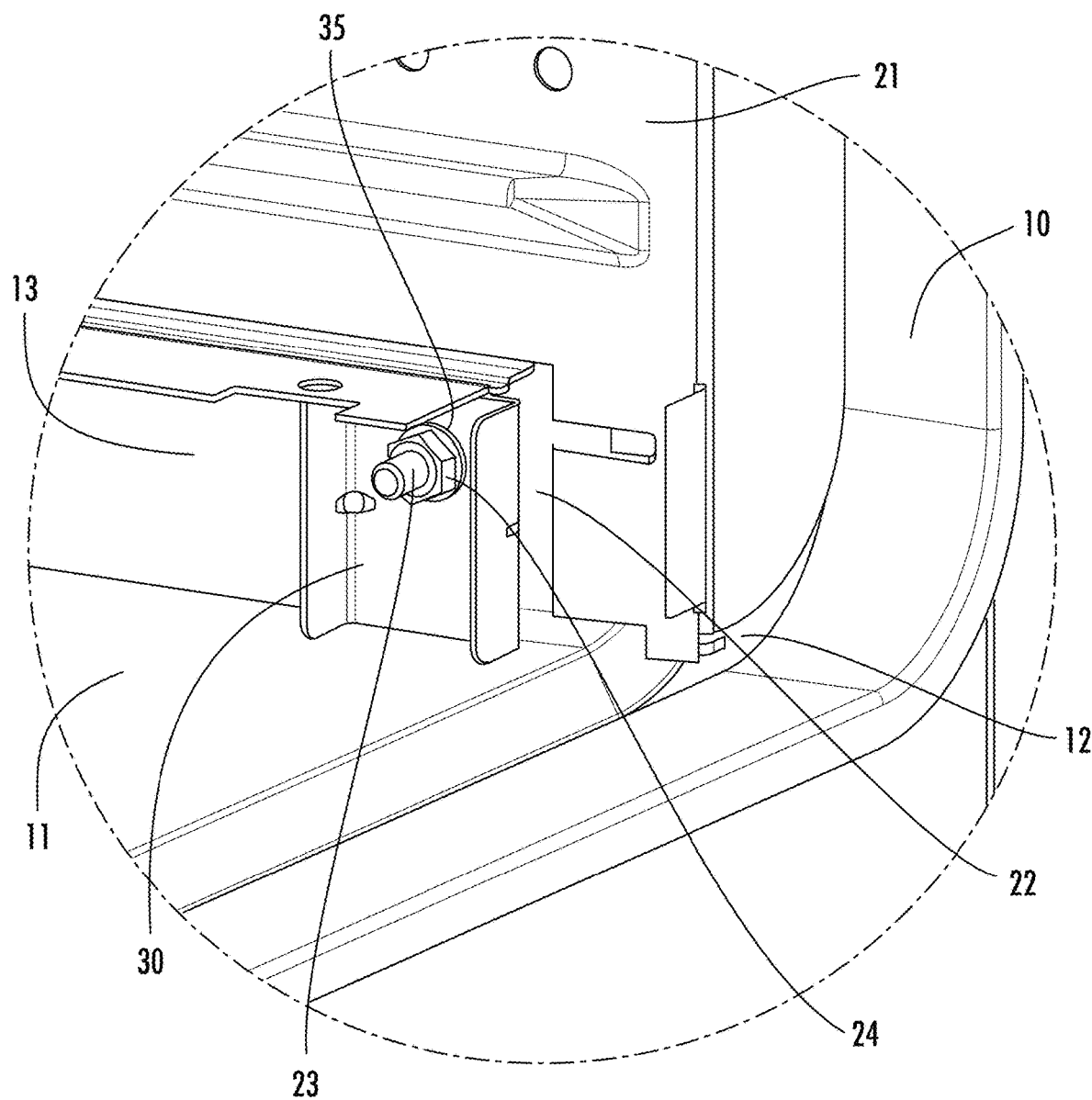
FIG. 1c: shows an even greater sectional enlargement from FIG. 1a which shows in detail the arrangement of a foot on the inner chamber and which supports the inner chamber.

If an installed foot 30 is considered in detail in its installed position, which can be gathered especially well referring again to the enlarged view according to the FIG. 1c, it can be recognized that it is movably connected to the component 21 of the inner chamber 2. This is realized in that a bolt 23 which is provided at least in sections with a thread cut on it is welded to a connection section 22 of the side wall forming the component 21 of the inner chamber 2, which bolt is guided in the oblong hole 35 and can be fixed with a fixing means 24 constructed here as a self-securing screw so that the back 31 of the foot 30 rests on the component 21 of the inner chamber 2, more precisely of its connection section 22 and runs substantially parallel to the component 21 of the inner chamber 2.

If the foot 30 is now pressed on one of its side walls 32, 33, which can serve as surfaces for introducing a shifting force parallel to the bottom 11 of the outer chamber 10 and to the component 21 of the inner chamber 2 in the direction of the rear wall of the air-conditioning cabinet 1, then the bolt 23 moves upward in the obliquely running oblong hole 35 and therefore forces a precisely fitting resting of the component 21 of the inner chamber 2 in the area of the not-shown cover of the outer chamber 10 because the total height of the system of component 21 of the inner chamber 2 with foot 30 arranged on it becomes greater. Therefore, a component 21 of the inner chamber 2, which component can be introduced without problems into the outer chamber 10 on account of its lower height, can be readily prepositioned there and be readily and precisely fit into the outer chamber 10 by the introduction of pressure on the easily accessible side walls 32, 33 of the foot 30 from the access direction, which entails a significant simplification of this step in the manufacturing process.

LIST OF REFERENCE NUMERALS 1 air-conditioning cabinet
2 inner chamber
3 door
4 shelf
10 outer chamber
11 bottom
12 transitional area
13 side wall
21 component (of the inner chamber)
22 connection section
23 bolt
24 fixing means
30 foot
31 back
32,33 side wall
34 reinforcement
35 oblong hole

The invention claimed is:

1. A method for positioning an inner chamber in an air-conditioning cabinet, comprising:
    providing a housing;
    providing an outer chamber located interior to the housing and comprising:
        an outer chamber interior wall with an outer chamber interior wall height;
        a cover; and
        a bottom, wherein the cover and bottom are separated by a distance that defines the outer chamber interior wall height;
    providing an inner chamber arranged in the outer chamber and with an inner chamber sidewall height that is less than the outer chamber interior wall height, and wherein a heater and/or cooler is arranged between the outer chamber and the inner chamber;
    providing a foot movably arranged on the inner chamber sidewall to multiple positions in such a manner that a height of a combination of the inner chamber sidewall with the foot movably arranged thereon is variable;
    positioning the foot to an installed position that presses the foot against the outer chamber bottom and presses the inner chamber sidewall against the outer chamber cover; and
    fixing the foot in the installed position.

2. The method according to claim 1, wherein positioning the foot to an installed position that presses the foot against the outer chamber bottom and presses the inner chamber sidewall against the outer chamber cover takes place by shifting the position of the foot in a plane parallel to the bottom of the outer chamber.

3. The method according to claim 2, wherein the shifting the position of the foot takes place in a direction parallel to the inner chamber on which the foot is arranged.

4. A method, comprising:
    providing an air-conditioning cabinet housing;
    providing an outer chamber located interior to the housing and comprising an outer chamber cover and an outer chamber bottom located opposite the outer chamber cover, and an outer chamber interior wall located between the outer chamber bottom and outer chamber cover and with an outer chamber interior wall height;
    providing an inner chamber arranged in the outer chamber;
    attaching a movable foot to the internal chamber;
    moving the movable foot such that a top of the inner chamber presses against the outer chamber cover and the movable foot the outer chamber bottom, and
    fixing the movable foot to the inner chamber.

5. The method of claim 4, wherein moving the movable foot such that the inner chamber presses against the outer chamber cover and the movable foot presses against the outer chamber bottom simultaneously comprises:
    moving the movable foot in a plane parallel to the outer chamber bottom; and
    moving the movable foot in a direction parallel to a sidewall of the inner chamber.

\* \* \* \* \*